Patented Dec. 9, 1930

1,784,286

UNITED STATES PATENT OFFICE

PAUL RALPH HERSHMAN, OF CHICAGO, ILLINOIS, ASSIGNOR OF ONE-FOURTH TO C. O. SETHNESS, ONE-FOURTH TO C. H. SETHNESS, AND ONE-FOURTH TO PAUL RUDNICK, ALL OF CHICAGO, ILLINOIS

PROCESS OF MAKING EASILY SOLUBLE STABLE HYPOCHLORITES

No Drawing.   Application filed April 15, 1927.  Serial No. 184,184.

The present invention relates particularly to those compounds which, when dissolved in water, will give up all, or a large part of the OCl which they contain, in the form of free hypochlorous acid, and has for its object the improvement of the processes of manufacturing such compounds.

I have found that when calcium hypochlorite, in paste form, is brought into intimate contact with stoichiometric proportions of alkali metal salts such as sodium acetate and then dried and ground or granulated, the resulting products are soluble in cold water, excepting only that a slight cloudiness may be produced in the water. In order that the solutions formed from such products may be crystal clear, the addition of a small amount of a solid acid or acids, or even of soluble starch, which usually contains a small amount of acid finely divided, is advisable. I have found, for instance, that the addition of fifteen percent of soluble starch will insure against cloudiness in the solutions. The compound, before the addition of the acid or starch, probably contains a considerable amount of sodium hypochlorite in stabilized form, and does not lose any chlorine during the drying process.

My improved compound can successfully be put into tablet form, without losing any of its solubility, whereas it has heretofore been difficult to compress granulated compounds of a similar nature.

In one of its aspects the present invention may be regarded as an improvement on that disclosed in my Patent 1,732,230, granted Oct. 22, 1929, entitled "Production of solid stable hypochlorites yielding hypochlorous acid", filed on the seventh day of February, 1927, Serial No. 167,070. As is the case with the process described in the aforesaid application, so here the final product will be acid, alkaline, or neutral, depending upon the quantity and nature of the acid that is used.

While my invention is particularly applicable to calcium hypochlorite, similar compounds of magnesium, etc., may be substituted for the calcium hypochlorite. Furthermore, sodium chloride or similar salts may be substituted for the sodium acetate; in other words, any alkali metal salt of such acids as will form soluble salts with calcium or magnesium. I therefore do not wish to limit my invention to the preferred form, but intend to cover all such forms thereof as come within the definitions of my invention constituting the appended claims.

I claim:

1. The method of making hypochlorite of calcium soluble which consists in mixing it, in the presence of moisture, with sodium acetate, and then drying the product.

2. The method of making hypochlorite of calcium soluble which consists in mixing it, in the presence of moisture, with sodium acetate, drying and comminuting the product, and adding to the product sufficient dry acid product to produce the desired alkalinity of acidity.

3. The method of making hypochlorite of calcium or magnesium soluble, which consists in mixing the more or less insoluble compound with an alkali metal salt of an acid that will form soluble salts with calcium or magnesium in the presence of moisture, and subsequently drying.

4. The method of making hypochlorite of calcium or magnesium soluble which consists in mixing it in the presence of moisture with an alkali metal salt of an acid that will form soluble salts with calcium or magnesium, drying and comminuting the product, and adding to the product sufficiently dry acid to produce the desired alkalinity or acidity.

In testimony whereof, I sign this specification.

PAUL RALPH HERSHMAN.